(12) United States Patent
Minamino et al.

(10) Patent No.: US 9,203,981 B2
(45) Date of Patent: Dec. 1, 2015

(54) INFORMATION PROCESSING APPARATUS, INFORMATION PROCESSING METHOD, AND PROGRAM

(75) Inventors: Hiroyuki Minamino, Kanagawa (JP); Shigenobu Ohga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 380 days.

(21) Appl. No.: 13/246,430

(22) Filed: Sep. 27, 2011

(65) Prior Publication Data
US 2012/0170075 A1 Jul. 5, 2012

(30) Foreign Application Priority Data
Oct. 4, 2010 (JP) ................................ P2010-225077

(51) Int. Cl.
H04N 1/00 (2006.01)
G06F 17/30 (2006.01)

(52) U.S. Cl.
CPC ...... *H04N 1/00175* (2013.01); *G06F 17/30265* (2013.01); *H04N 1/00188* (2013.01); *H04N 1/00411* (2013.01); *H04N 1/00435* (2013.01); *H04N 1/00453* (2013.01); *H04N 2201/3214* (2013.01); *H04N 2201/3215* (2013.01); *H04N 2201/3273* (2013.01)

(58) Field of Classification Search
None
See application file for complete search history.

(56) References Cited

U.S. PATENT DOCUMENTS

| | | |
|---|---|---|
| 2005/0270579 A1 | 12/2005 | Hibi et al. |
| 2007/0222768 A1* | 9/2007 | Geurts et al. .................. 345/173 |
| 2008/0025566 A1* | 1/2008 | Widdowson et al. ......... 382/103 |

FOREIGN PATENT DOCUMENTS

| | | |
|---|---|---|
| JP | 11-66089 | 3/1999 |
| JP | 2004-255740 | 9/2004 |
| JP | 2005-349822 | 12/2005 |
| JP | 2006-60518 | 3/2006 |
| JP | 2006-65368 | 3/2006 |
| JP | 2007-304735 | 11/2007 |

* cited by examiner

*Primary Examiner* — Saeid Ebrahimi Dehkordy
*Assistant Examiner* — Lennin RodriguezGonzalez
(74) *Attorney, Agent, or Firm* — Frommer Lawrence & Haug LLP; William S. Frommer; Ellen Marcie Emas (57) ABSTRACT

Disclosed herein is an information processing apparatus including: a read section configured to read a plurality of data items as well as date and time information related to the data items; a slider configured to generate a first operation signal on accepting the input of an operation of a movable knob part of the slider by a user to a position corresponding to the length of a time period; a grouping section configured to divide the plurality of data items into groups based on the time period determined from the first operation signal as well as on the read date and time information; and a display control section configured to display a list of representative pictures representing the data items in each of the groups, on a screen of a display portion.

7 Claims, 7 Drawing Sheets

INFORMATION PROCESSING APPARATUS, INFORMATION PROCESSING METHOD, AND PROGRAM

BACKGROUND

The present disclosure relates to an information processing apparatus, an information processing method, and a program.

There exists the technique of displaying a plurality of pictures on a single screen. This technique is also utilized by picture editing software for use on personal computers and the like. The technique is further employed by a manual operation screen of a storefront printer that a user may directly operate to have pictures developed on developing paper.

SUMMARY

The storefront printer is generally required to let the user gain quick and easy access to target pictures desired to be output from among a plurality of pictures. In this regard, the printer may be typically arranged to incorporate a technique of dividing a plurality of pictures into groups so that the user may search for desired pictures according to these groups. Such grouping is usually based on a technique of referencing time information and file names included in the picture data.

Japanese Patent Laid-Open No. 2004-255740 (called the Patent Document 1 hereunder) discloses a technique of dividing pictures into groups by date, by month, by folder, etc. Japanese Patent Laid-Open No. Hei 11-66089 (called the Patent Document 2 hereunder) discloses a technique of permitting the direct input of not only such information as dates but also keywords and place names with which to search for target pictures.

In some cases, it may be desirable for a plurality of pictures to be placed into the same group even if their dates of creation span different dates and/or months to cover the same theme or the same event, for example. However, the technique of the Patent Document 1 can only put these pictures into the same group because the technique is designed to create groups of pictures by date and by month.

In order to bypass the above problem, the pictures may conceivably be grouped by folder. In this case, however, the user will need to group the pictures into relevant folders beforehand. That means the technique of the Patent Document 1 is generally not suitable when, say, a storage medium is detached from the camera immediately before being attached to the storefront printer for data loading thereinto.

The technique of the Patent Document 2 presupposes that the user can input conditions by which to specify desired pictures. That means the technique of the Patent Document 2 is usually not suitable when, say, the user wants to find target pictures in a short time.

The technique of Japanese Patent Laid-Open No. 2005-349822 is also the technique of searching for pictures by date. This technique typically requires that the user possess a knowledge of such details about pictures on storage media as, say, the month, date, and approximate time of day at which each picture was taken. If a large number of pictures were taken on the same day although pictures can be grouped only by date and not by time of day as dictated by this technique, it may be inconvenient to search the numerous taken pictures for desired ones. In another case, a large quantity of pictures held on storage media may have been taken such a long time ago that the user may have little recollection of when each of these pictures was taken. In that case, the inability to determine the dates the pictures were taken may lead to additional time and effort required in searching for target pictures.

The present disclosure has been made in view of the above circumstances and provides an information processing apparatus, an information processing method, and a program for allowing the time period used for grouping data to be changed easily so that a plurality of data may be displayed in groups at intervals of that time period, thereby permitting a user to search for target pictures easily.

According to one embodiment of the present disclosure, there is provided an information processing apparatus including: a read section configured to read a plurality of data items as well as date and time information related to the data items; a slider configured to generate a first operation signal on accepting the input of an operation of a movable knob part of the slider by a user to a position corresponding to the length of a time period; a grouping section configured to divide the plurality of data items into groups based on the time period determined from the first operation signal as well as on the read date and time information; and a display control section configured to display a list of representative pictures representing the data items in each of the groups, on a screen of a display portion.

Preferably, the information processing apparatus of the present disclosure may further include a group switching button configured to generate a second operation signal for switching one group of the data items with another group on accepting the input of an operation of the group switching button by the user; wherein, based on the second operation signal, the display control section may switch the list of representative pictures representing the data items in one group with a list of representative pictures representing the data items in another group.

Preferably, the data items may be composed of still picture data, moving picture data, or audio data.

According to another embodiment of the present disclosure, there is provided an information processing method including: causing a read section to read a plurality of data items as well as date and time information related to the data items; causing a slider to generate a first operation signal on accepting the input of an operation of a movable knob part of the slider by a user to a position corresponding to the length of a time period; causing a grouping section to divide the plurality of data items into groups based on the time period determined from the first operation signal as well as on the read date and time information; and causing a display control section to display a list of representative pictures representing the data items in each of the groups, on a screen of a display portion.

According to a further embodiment of the present disclosure, there is provided a program for causing a computer to execute a procedure including: causing a read section to read a plurality of data items as well as date and time information related to the data items; causing a slider to generate a first operation signal on accepting the input of an operation of a movable knob part of the slider by a user to a position corresponding to the length of a time period; causing a grouping section to divide the plurality of data items into groups based on the time period determined from the first operation signal as well as on the read date and time information; and causing a display control section to display a list of representative pictures representing the data items in each of the groups, on a screen of a display portion.

According to the present disclosure outlined above, it is easy to change the time period used for grouping data so that when a plurality of picture data items are displayed in groups at intervals of that time period, the user can easily search for target pictures.

DETAILED DESCRIPTION OF THE PREFERRED EMBODIMENTS

Some preferred embodiments of the present disclosure will now be described in detail with reference to the accompanying drawings. Throughout this specification and the drawings, like reference characters designate like or corresponding components having substantially the same structure, and their explanations may be omitted hereunder where redundant.

The description will be given under the following headings:
1. Structure of the printer control apparatus;
2. Operation of the printer control apparatus;
3. Selection screen; and
4. Switching of the selection screen.

<1. Structure of the Printer Control Apparatus>

Figure 1:
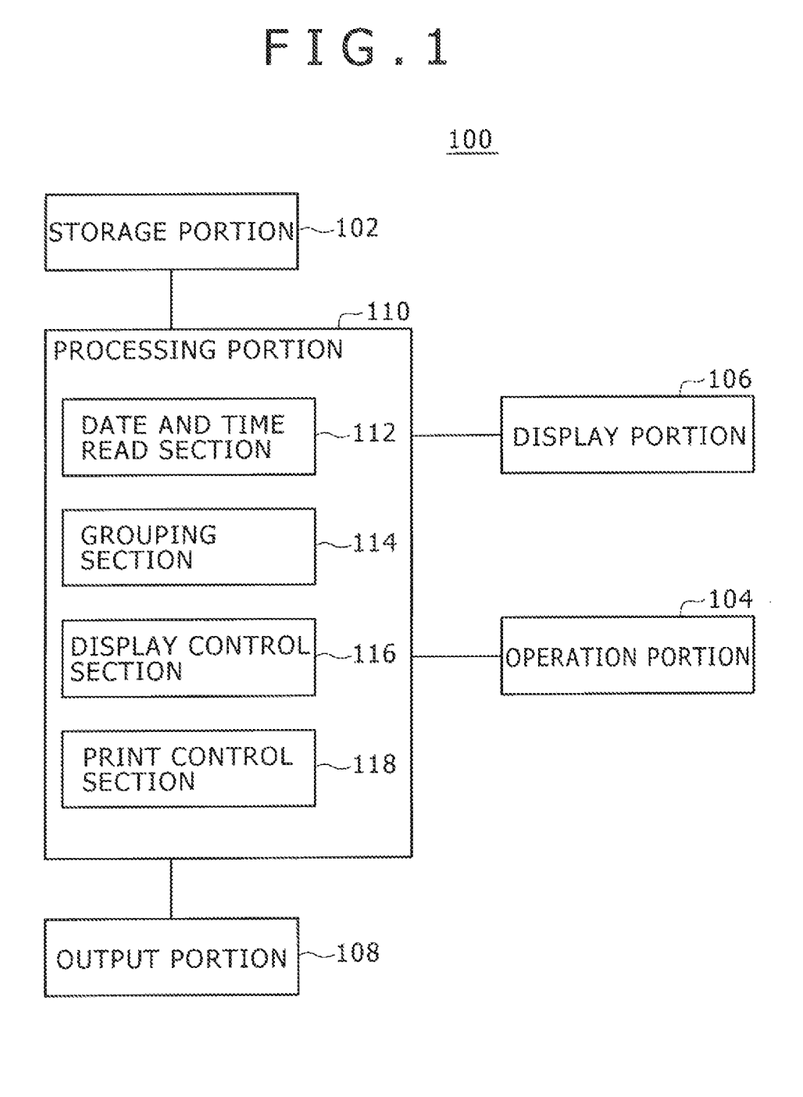
FIG. 1 is a block diagram of a printer control apparatus embodying embodiments of the present disclosure.

A printer control apparatus 100 embodying embodiments of the present disclosure may be a display-integrated printer installed at the storefront and directly operable by a user, for example. As shown in FIG. 1, the printer control apparatus 100 is generally made up of a storage portion 102, an operation portion 104, a display portion 106, an output portion 108, and a processing portion 110.

The storage portion 102 is a typical storage device capable of writing and reading data to and from storage media. In the printer control apparatus 100, the storage portion 102 may preferably be composed of a plurality of storage devices in order to deal with such media as memory cards and optical disks. The storage portion 102 reads picture data from a piece of storage media loaded by the user and sends the retrieved picture data to the processing portion 110.

The operation portion 104 is a device that accepts input from the user. For example, the operation portion 104 may be a touch panel which is attached to the display portion 106 and which corresponds to screen display of the display portion 106, or a set of buttons, controls, etc., mounted on the printer control apparatus 100. On accepting the user's input, the operation portion 104 generates a corresponding operation signal and feeds the generated operation signal to the processing portion 110.

The display portion 106 may be a liquid crystal display, for example. The display portion 106 displays pictures on its screen based on a display signal generated by a display control section 116 of the processing portion 110. For example, the display portion 106 may display pictures retrieved from storage media as well as menus necessary for operating the printer control apparatus 100.

The output portion 108 is a typical picture formation device. As such, the output portion 108 prints pictures on recording paper based on an output signal generated by a print control section 118 of the processing portion 110. For example, the output portion 108 may print pictures according to the principle of dye sublimation printing, ink jet printing, or electrophotographic printing. As shown in FIG. 1, the output portion 108 in the printer control apparatus 100 may be integrally constituted by the storage portion 102, operation portion 104, display portion 106, and processing portion 110 that controls these components for example. Alternatively, an output portion 108 with its own processing portion may be formed independently of the storage portion 102, operation portion 104, display portion 106, and processing portion 110 that controls these components.

The processing portion 110 may typically be a CPU that executes programs and commands so as to perform arithmetic operations based on data in memory or to control the components of the printer control apparatus 100. As shown in FIG. 1, the processing portion 110 may include a date and time read section 112, a grouping section 114, the display control section 116, and the print control section 118, for example.

The date and time read section 112 is a typical read section. Based on the picture data read from storage media, the date and time read section 112 reads date and time information accompanying the picture data.

The grouping section 114 divides a plurality of pictures into a single or a plurality of groups based on the granularity of grouping determined from the user's operations and according to the date and time information about the picture data.

The display control section 116 generates the display signal based on the picture data and sends the generated display signal to the display portion 106. For example, the display control section 116 may cause a slider 154 and group switching buttons 162 and 164 to appear on the screen. Also, the display control section 116 displays a list of representative pictures representing the picture data items on the screen.

The print control section 118 generates a print signal based on the picture data and outputs the generated print signal to the output portion 108.

What follows is a detailed explanation of the process performed by the grouping section 114.

A plurality of pictures are divided into the same or other groups depending on the time period during which the pictures were taken. For example, if the time period is set to six hours, the pictures constituted by a reference picture of a first group and by all other pictures taken within the six-hour time period may be classified into the first group. The pictures taken more than six hours later than the reference picture of the first group may be divided into other groups (e.g., second, third, . . . groups). From among the pictures taken more than six hours later than the reference picture of the first group, a suitable picture may be selected for use as a reference picture of a second group. The pictures going into the second group may then be determined relative to the reference picture of that group. In this manner, the pictures going into a plurality of groups may be determined.

The time period covering the dates and times at which pictures were taken and used as the reference for grouping is not limited to the above-mentioned six hours but may be established as desired (e.g., one hour, one day, one month, one year). With this embodiment of the disclosure, the length of the time period covering the dates and times the pictures were taken may be called granularity. The coarser the level of granularity, the longer the time period spanning the dates and times the pictures were taken; the finer the level of granularity, the shorter the time period covering the dates and times the pictures were taken.

That is, the time period for grouping may be changed as needed in searching for target pictures. For example, the target pictures may be among a large number of pictures taken in a short period of time such as at a wedding ceremony or on a day trip; the target pictures may also be among the pictures taken over a longer time period such as on a week-long travel or taken of a child growing up over an extended period of time.

For example, if it is desired to search for the target pictures from among the numerous pictures taken at a wedding ceremony or on a day trip, a knob 156 of the slider 154 need only be set to a finer level of granularity. This will cause the multiple pictures to be divided into a plurality of groups formed at intervals of, say, one hour (or several hours). When the multiple pictures are displayed in groups at intervals of one hour (or several hours), it is easy to find the target pictures from among the numerous pictures taken in a single day.

As another example, if it is desired to search for the target pictures from among the pictures taken on a week-long travel or taken of a child growing up over an extended time period, the knob 156 of the slider 154 need only be set to a coarser level of granularity. This will cause the multiple pictures to be divided into a plurality of groups formed at intervals of, say, one day (or several days, one week, one month, etc.). When the multiple pictures are displayed in groups at intervals of one day (or several days, one week, one month, etc.), it is easy to find the target pictures from among the numerous pictures taken over the long period of time.

The grouping section 114 performs its grouping process based on the level of granularity for grouping determined by the user's operations. If the time period for grouping is set easily, the user can easily search for the target pictures. With this embodiment, the time period covering the dates and times at which pictures were taken is established upon grouping using the slider 154 that constitutes a user interface. The slider 154 allows the knob 156 to be set to the positions corresponding to desired time periods. Because the user can easily move the position of the knob 156, it is easy to establish the time period for grouping, which makes it easier to search for the target pictures.

<2. Operation of the Printer Control Apparatus>

Figure 2:
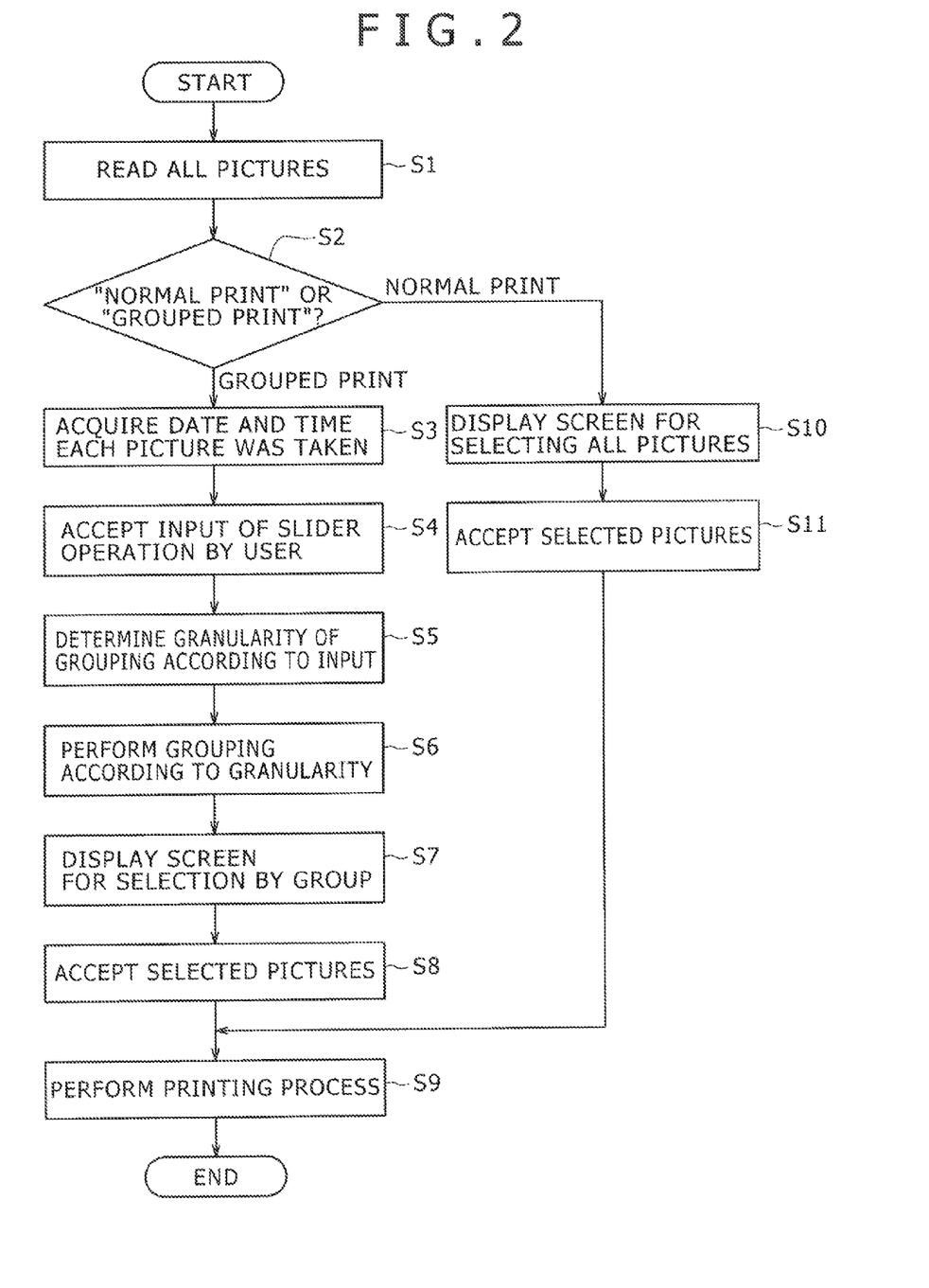
FIG. 2 is a flowchart outlining the operation of the printer control apparatus as one embodiment of the present disclosure.

Explained below in reference to FIG. 2 is the operation of the printer control apparatus 100 embodying the embodiments of the present disclosure. FIG. 2 is a flowchart outlining how the printer control apparatus 100 typically operates.

The printer control apparatus 100 first reads the picture data of all pictures from a piece of storage media inserted by the user (in step S1). With the picture data thus read, the printer control apparatus 100 allows the display portion 106 to display pictures based on the retrieved data or enables the output portion 108 to print pictures from the data onto recording paper.

The printer control apparatus 100 then causes the display portion 106 to display on its screen a verification menu prompting the user to select either "normal print mode" or "grouped print mode," and determines which of the two modes is selected (in step S2). Normal print mode is a mode in which is displayed a list of representative pictures (e.g., thumbnails or icons) representing a plurality of pictures not in groups but as a whole. Grouped print mode is a mode in which is displayed a list of representative pictures representing a plurality of pictures divided into groups.

If normal print mode is selected, the printer control apparatus 100 causes the display portion 106 to display a selection screen 150 prompting the user to select pictures (in step S10). At this point, the selection screen 150 displays a list of all pictures recorded on the recording media. Where a single screen fails to accommodate all pictures, the list may be arranged to let the user feed pages (i.e., other screens) of pictures one after another through switching operations. The selection screen 150 accepts the pictures selected to be printed (in step S11).

If grouped print mode is selected, the printer control apparatus 100 acquires the dates and times at which the pictures recorded on the storage media were taken (in step S3). The user operates the knob 156 of the slider 154 to determine the time period at intervals of which a plurality of pictures are to be divided into groups. The printer control apparatus 100 accepts the input of the slider operations by the user (in step S4). After operating the slider 154, the user selectively operates an enter button 158. This operation determines the level of granularity for grouping according to the position of the knob 156 of the slider 154 (in step S5).

The printer control apparatus 100 then performs a grouping process reflecting the level of granularity thus determined (in step S6). As a result, the pictures recorded on the storage media are divided into a plurality of groups.

With a plurality of pictures divided into groups, the printer control apparatus 100 causes the display portion 106 to display the selection screen 150 (in step S7). The selection screen 150 displays a list of pictures recorded on the storage media in groups.

The list of a plurality of pictures currently displayed on the selection screen 150 may be switched with another list of pictures in the same group or with a list of pictures in a different group in keeping with the user's operations. The selection screen 150 accepts the pictures selected to be printed (in step S8).

The pictures selected in step S8 or S11 are then printed on recording paper in a printing process (in step S9). When the above-described steps are carried out, the user can search a list of a plurality of pictures in groups for target pictures, select the pictures to be printed, and get the printer control apparatus 100 to print the selected pictures.

<3. Selection Screen>

Figure 3:
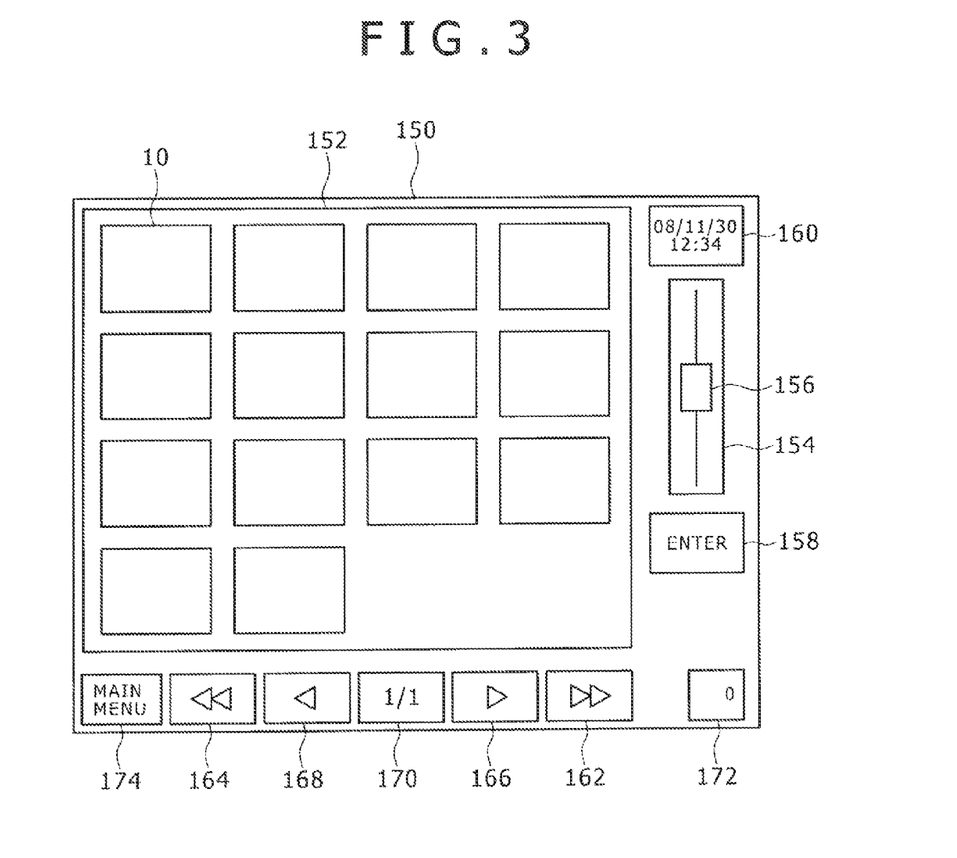
FIG. 3 is an explanatory view showing a selection screen displayed on a display portion of the printer control apparatus.

Explained below in reference to FIG. 3 is the selection screen 150 displayed on the display portion 106 of the printer control apparatus 100.

The selection screen 150 displays a listing space 152 for showing a list of pictures, the slider 154, the enter button 158, a date and time information display field 160, group switching buttons 162 and 164, page switching buttons 166 and 168, a page count display field 170, and a selected picture count display field 172, among others.

The listing space 152 may display thumbnails 10 representative of pictures. The thumbnails 10 allow the user instantly to recognize the target pictures to be printed.

The slider 154 is an interface on which the knob 156 is made linearly movable. The positions to which the knob 156 is set correspond to the levels of granularity for grouping. For example, the higher the knob 156 is positioned in FIG. 3, the coarser the level of granularity for grouping; the lower the knob 156 is positioned, the finer the level of granularity for grouping.

Operating the enter button 158 starts the grouping process whose level of granularity corresponds to the position to which the knob 158 has been adjusted by the user. With the enter button 158 operated, the pictures are divided into groups in accordance with the level of granularity for grouping corresponding to the position of the knob 156.

After a plurality of pictures have been divided into groups, the date and time information display field 160 displays the date and time at which the first picture of the group currently displayed in the listing space 152 was taken. The display field 160 allows the user to know the date and time starting from which the pictures of the currently displayed groups were taken.

The group switching buttons 162 and 164 are used to display other groups of pictures different from the currently displayed group. Operating the group switching button 162 calls up a group subsequent to the currently displayed group. Operating the group switching button 164 invokes a group preceding the currently displayed group.

The page switching buttons 166 and 168 are used to display other pages of pictures constituting part of the currently displayed group that cannot be displayed within a single screen. Operating the page switching button 166 calls up a page of pictures subsequent to the currently displayed pictures within the same group. Operating the page switching button 168 invokes a page of pictures preceding the currently displayed pictures within the same group.

The page count display field 170 displays the total number of pages making up the picture list as well as the current page number. In normal print mode, the total number of pages means the number of pages generated when all pictures are arrayed. In grouped print mode, the total number of pages means the number of pages generated when the pictures belonging to the currently displayed group are arrayed.

The selected picture count display field 172 displays the total number of the pictures selected to be printed.

<4. Switching of the Selection Screen>

Figure 7:
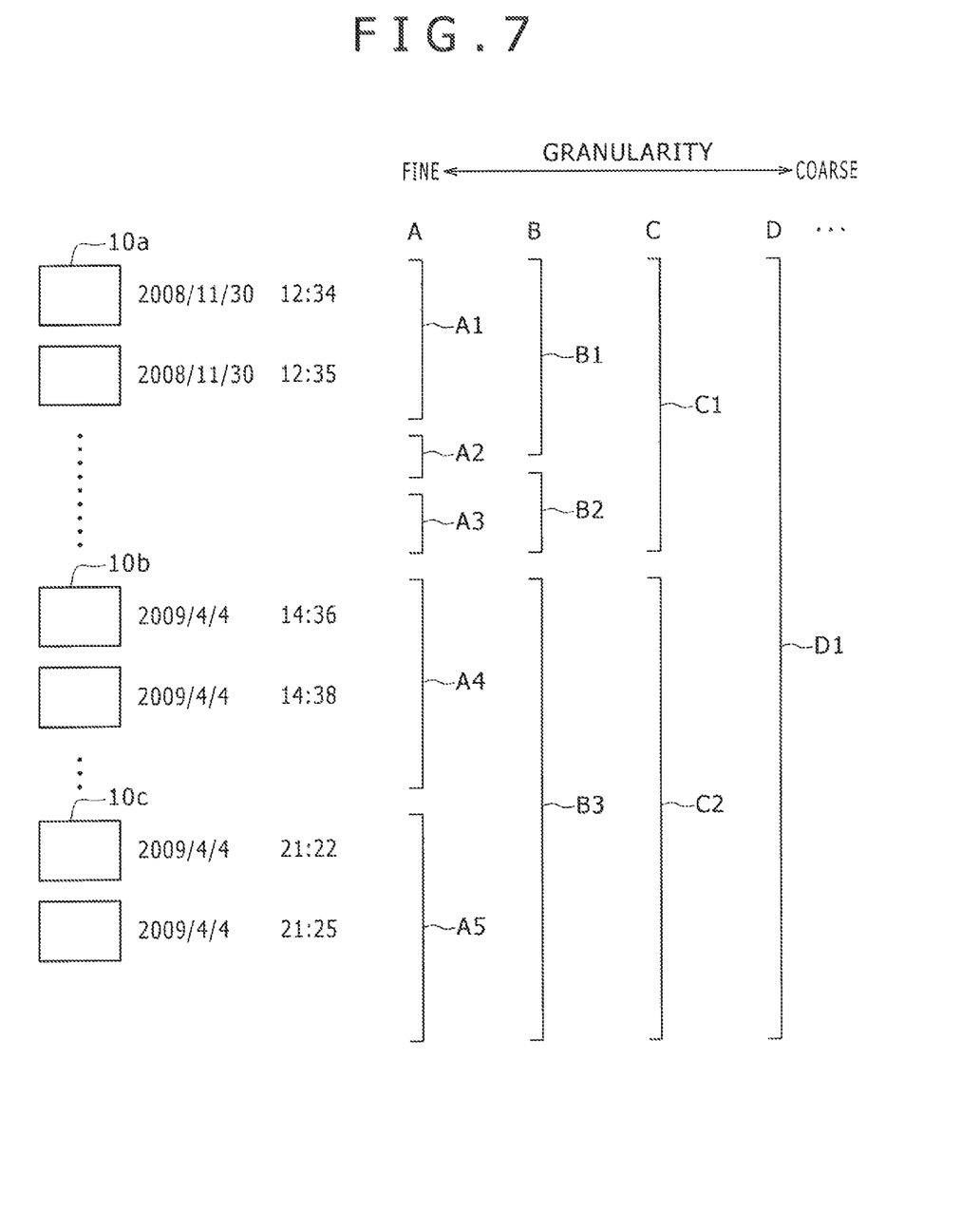
FIG. 7 is an explanatory view showing conceptually how a plurality of pictures arrayed chronologically may be divided into groups.

Explained below is how the selection screen 150 is typically displayed and switched when a plurality of pictures 10 are recorded on storage media in a manner arranged chronologically as shown in FIG. 7.

Figure 4:
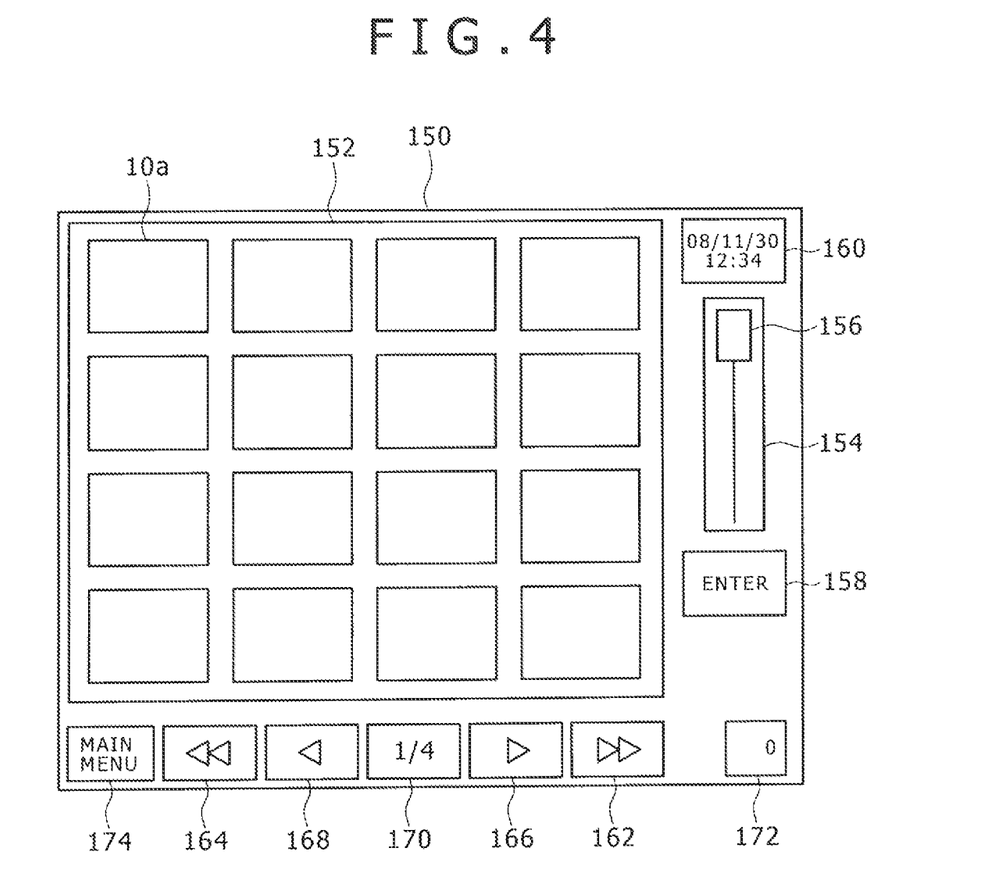
FIG. 4 is another explanatory view showing the selection screen.

FIG. 4 shows an example of pictures 10 not grouped when displayed. In this example, all pictures are arrayed on four pages in total. The knob 156 of the slider 154 is set to the highest position of the slider 154 designating the coarsest level of granularity for grouping.

Figure 5:
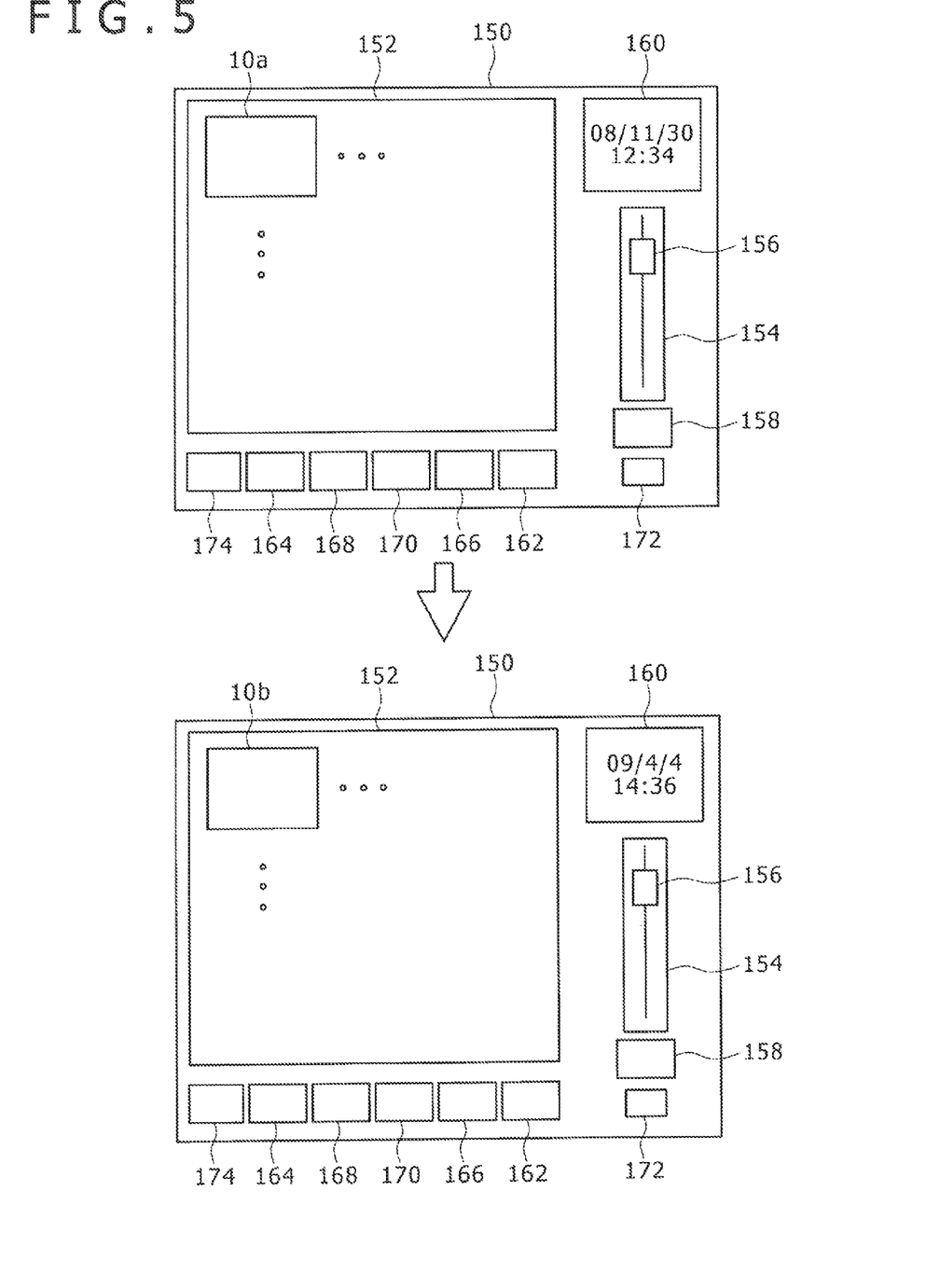
FIG. 5 is an explanatory view showing how the selection screen may be switched.

FIG. 5 shows an example in which a plurality of pictures 10 are divided into groups at intervals of one day (24 hours) or longer. In this case, a plurality of pictures are divided into groups such as C1, C2, etc., in FIG. 7.

The first page of group C1 in FIG. 7 is displayed as shown on the upper screen of FIG. 5. Operating the group switching button 162 calls up group C2 that is displayed as shown on the lower screen of FIG. 5. Specifically, the date and time at which the first picture 10a of the group displayed on the upper screen of FIG. 5 was taken is 12:34, Nov. 30, 2008, and the date and time the first picture 10b of the group displayed on the lower screen of FIG. 5 was taken is 14:36, Apr. 4, 2009. When the pictures have thus been divided into groups at intervals of one day (24 hours) or longer and when one group of pictures is switched with another for display, pictures taken on different days are displayed in list form.

Figure 6:
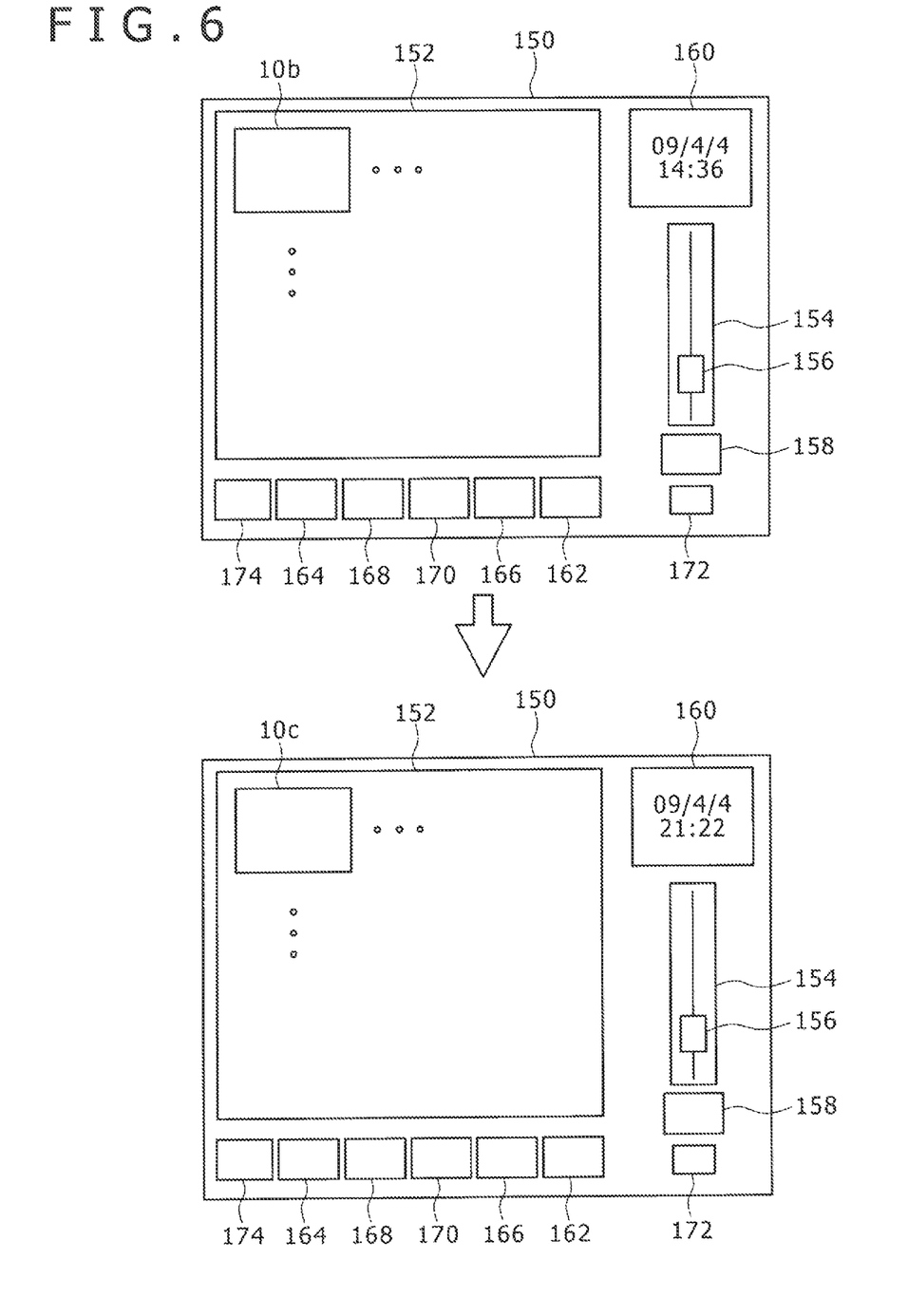
FIG. 6 is another explanatory view showing how the selection screen may be switched.

FIG. 6 shows an example in which a plurality of pictures are displayed after been divided into groups at intervals of several hours. In this case, the multiple pictures are classified into groups A1, A2, etc., as shown in FIG. 7.

The first page of group A4 in FIG. 7 is displayed as shown on the upper screen of FIG. 6. Operating the group switching button 162 calls up group A5 that is displayed as shown on the lower screen of FIG. 6. Specifically, the date and time at which the first picture 10b of the group displayed on the upper screen of FIG. 6 was taken is 14:36, Apr. 4, 2009, and the date and time the first picture 10c of the group displayed on the lower screen of FIG. 6 was taken is 21:22 of the same day. When the pictures have thus been divided into groups at intervals of several hours and when one group of pictures is switched with another for display, pictures taken at intervals of several hours on the same day are displayed in list form.

The embodiment of the disclosure explained above allows the user to determine the time period at intervals of which a plurality of pictures are to be divided into the same or different groups by simply operating the slider 154. The level of granularity for such grouping can be changed as desired by varying the position at which the slider 154 is set. This feature is advantageous where a large unspecified number of users are expected to utilize the printer control apparatus 100 installed at the storefront.

For example, when pictures are recorded on storage media, the breakdown of the pictures taken on a day trip and that of those taken on a week-long travel may well be different. If the pictures of events of different scales (i.e., different time periods over which the events took place) are recorded in a mixed manner on a single piece of storage media, it is desirable to let the user determine the scale that should serve as the reference time period for the pictures taken of the events. In the past, the level of granularity for grouping was typically fixed to, say, one day. This practice not only failed to high-light the advantages of grouping but also led to certain confusion on the users' part. With this embodiment, by contrast, it is easy to establish grouping conditions such as the scale (length) of the event of which the pictures were taken and the time period at intervals of which the pictures taken are to be divided. This feature allows the user to take advantage of the grouping process and search for target pictures easily.

This embodiment of the disclosure constitutes a grouping method that supports the intuitive operations of the user and thus helps improve the accuracy of the user's search. Because the user can determine the level of granularity for grouping, unpredictable grouping is unlikely to occur and confusion is minimized.

For example, suppose that a user wants to print from storage media the pictures taken more or less in autumn. In such a case, the pictures need only be divided into groups at intervals of one or a few months. Suppose also that another user wants to print the pictures taken around the noon during a daylong event. In this case, the pictures may be divided into groups at intervals of one or a few hours. In this manner, this embodiment with its intuitively operable interface makes the date input procedure appreciably simpler than if the date and time were to be input numerically. In addition, the embodiment allows the user with no recollection of the exact dates and times pictures were taken, to find desired pictures easily from among them.

It is to be understood that while the disclosure has been described in conjunction with specific embodiments with reference to the accompanying drawings, it is evident that many alternatives, modifications and variations will become apparent to those skilled in the art in light of the foregoing description. It is thus intended that the present disclosure embrace all such alternatives, modifications and variations as fall within the spirit and scope of the appended claims.

For example, the above-described embodiment was shown to divide picture data into groups. However, this is not limitative of the present disclosure. The disclosure is effective in any situation where a plurality of target items are divided into groups in reference to time information. For example, the same algorithm may be applied to audio data and moving picture data.

Also in the foregoing description, the present disclosure was shown practiced as the printer control apparatus 100 that serves as a terminal operated at the storefront. However, this is not limitative of the present disclosure. For example, when applied to software running on a personal computer, the disclosed technique is advantageous in allowing the level of granularity for grouping to be changed as desired. As another example, in managing the data of still pictures or moving pictures in a storage area of a camera or the like, the disclosed technique allows the user to view the pictures in groups in list form. This makes it easy for the user not only to check the dates and times the pictures were taken but also to determine the locations and other specifics of the events of which the pictures were taken.

Furthermore, the above-described embodiment was shown to have the slider 154, enter button 158, group switching buttons 162 and 164, and other buttons displayed on the screen of the display portion 106. However, this is not limitative of the present disclosure. Alternatively, the slider 154, enter button 158, group switching buttons 162 and 164, and other buttons may constitute hardware components attached to the enclosure of the printer control apparatus 100.

The present disclosure contains subject matter related to that disclosed in Japanese Priority Patent Application JP 2010-225077 filed in the Japan Patent Office on Oct. 4, 2010, the entire content of which is hereby incorporated by reference.

What is claimed is:

1. An information processing apparatus comprising:
a read section configured to read a plurality of data items as well as date and time information related to said data items from a data storage medium;
a slider configured to generate a first operation signal which changes based on an adjustment of a position of a movable knob part of said slider by a user, wherein the position of the moveable knob part corresponds to a granularity indicating a size of a time period covering the read date and time information related to said data items, wherein a coarser a level of granularity selected by the user, a longer the size of the time period spanning the read dates and times related to said data items and a finer the level of granularity selected by the user, a shorter the size of the time period spanning the read dates and times related to said data items;
a grouping section configured to divide said plurality of data items into groups based on (a) the granularity of said time period determined from said first operation signal generated based on the position of the moveable knob part adjusted by the user and (b) the time period during which the data items were acquired based on the read date and time information related to said data items; and
a display control section configured to display a list of representative pictures in groups, representing said data items in each of said groups based on a selected granularity, on a screen of a display portion.

2. The information processing apparatus according to claim 1, further comprising
a group switching button configured to generate a second operation signal for switching one group of the data items with another group on accepting the input of an operation of said group switching button by said user; wherein, based on said second operation signal, said display control section switches the list of representative pictures representing the data items in one group with a list of representative pictures representing the data items in another group.

3. The information processing apparatus according to claim 1, wherein said data items are composed of still picture data, moving picture data, or audio data.

4. The information processing apparatus according to claim 1, further comprising a print control section configured to generate a print signal based on at least one of the data items.

5. The information processing apparatus according to claim 1, wherein the slider is displayed on the screen by the display control section.

6. An information processing method comprising:
causing a read section to read a plurality of data items as well as date and time information related to said data items from a data storage medium;
causing a slider to generate a first operation signal which changes based on an adjustment of a position of a movable knob part of said slider by a user, wherein the position of the movable knob part corresponds to a granularity indicating a size of a time period covering the read date and time information related to said data items, wherein a coarser a level of granularity selected by the user, a longer the size of the time period spanning the read dates and times related to said data items and a finer the level of granularity selected by the user, a shorter the size of the time period spanning the read dates and times related to said data items;
causing a grouping section to divide said plurality of data items into groups based on (a) the granularity of said time period determined from said first operation signal generated based on the position of the moveable knob part adjusted by the user and (b) the period during which the data items were acquired based on the read date and time information related to said data items; and
causing a display control section to display a list of representative pictures in groups, representing said data items in each of said groups based on a selected granularity, on a screen of a display portion.

7. A program embodied on a non-transitory computer readable medium for causing a computer to execute a procedure comprising:
causing a read section to read a plurality of data items as well as date and time information related to said data items from a data storage medium;
causing a slider to generate a first operation signal which changes based on an adjustment of a position of a movable knob part of said slider by a user, wherein the position of the movable knob part corresponds to a granularity indicating a size of a time period covering the read date and time information related to said data items, wherein a coarser a level of granularity selected by the user, a longer the size of the time period spanning the read dates and times related to said data items and a finer the level of granularity selected by the user, a shorter the size of the time period spanning the read dates and times related to said data items;
causing a grouping section to divide said plurality of data items into groups based on (a) the granularity of said time period determined from said first operation signal generated based on the position of the moveable knob part adjusted by the user and (b) the period during which the data items were acquired based on the read date and time information related to said data items; and
causing a display control section to display a list of representative pictures in groups, representing said data items in each of said groups based on a selected granularity, on a screen of a display portion.

* * * * *